(12) United States Patent
Adler

(10) Patent No.: US 7,849,784 B2
(45) Date of Patent: Dec. 14, 2010

(54) COFFEE OR TEA FILTERING PRESS

(76) Inventor: Alan J. Adler, 446 Raquel La., Los Altos, CA (US) 94022

(*) Notice: Subject to any disclaimer, the term of this patent is extended or adjusted under 35 U.S.C. 154(b) by 744 days.

(21) Appl. No.: 11/132,500

(22) Filed: May 18, 2005

(65) Prior Publication Data

US 2006/0260471 A1    Nov. 23, 2006

(51) Int. Cl.
*A47J 31/18* (2006.01)
*A47J 31/20* (2006.01)

(52) U.S. Cl. .................. 99/297; 99/287; 99/302 P; 99/322

(58) Field of Classification Search .............. 99/297, 99/287, 302 P, 306, 322; 210/473, 474, 477
See application file for complete search history.

(56) References Cited

U.S. PATENT DOCUMENTS

| | | | | |
|---|---|---|---|---|
| 211,236 A | * | 1/1879 | Hartman, Jr. ................. | 99/287 |
| 802,378 A | * | 10/1905 | Ellis ............................ | 99/305 |
| 955,616 A | | 4/1910 | Tava | |
| 1,499,281 A | * | 6/1924 | Altieri ........................ | 99/306 |
| 1,751,397 A | * | 3/1930 | Delsuc ........................ | 99/306 |
| 2,529,395 A | * | 11/1950 | Hummel ..................... | 99/302 P |
| 2,601,821 A | * | 7/1952 | Johnson ...................... | 99/287 |
| 3,120,170 A | * | 2/1964 | Garte .......................... | 99/287 |
| 3,596,806 A | | 8/1971 | Harschel | |
| 3,657,993 A | * | 4/1972 | Close .......................... | 99/297 |
| 3,695,168 A | * | 10/1972 | Van Brunt ................... | 99/306 |
| 5,312,637 A | * | 5/1994 | Midden ...................... | 426/433 |
| 5,478,586 A | | 12/1995 | Connor | |
| 5,942,143 A | | 8/1999 | Hartman et al. | |
| 6,298,771 B1 | * | 10/2001 | Calvento ..................... | 99/323 |

* cited by examiner

*Primary Examiner*—Reginald L Alexander
(74) *Attorney, Agent, or Firm*—Townsend and Townsend and Crew LLP

(57) ABSTRACT

A coffee or tea filtering press includes a hollow cylinder having top and bottom openings, a perforated removable cap which encloses the bottom opening, a removable piston which is inserted into said top opening and pressed downward to force liquid in the cylinder through the perforated cap, and a support to hold the press above the mouth of an open vessel.

17 Claims, 3 Drawing Sheets

COFFEE OR TEA FILTERING PRESS

BACKGROUND OF THE INVENTION

The present invention relates generally to beverage makers and more specifically to a press for making coffee or tea,

SUMMARY OF THE INVENTION

According to an aspect of the present invention, a coffee or tea filtering press comprises a hollow cylinder having top and bottom openings, a removable perforated cap which encloses the bottom opening, a removable piston which is inserted into the top opening and pressed downward to force liquid in the cylinder through the perforated cap, and a support to hold said press above the mouth of an open vessel. The support may extend radially outward from the hollow cylinder, or it may extend radially outward from the perforated cap. In the latter instance, the support has an upper cavity to collect liquid which leaks between the cylinder and the cap.

In some embodiments, the support is shaped to permit air to pass readily out of the open vessel when said press is resting on top of the vessel. The piston may be capped with a flexible seal to engage the inside of said hollow cylinder.

A further understanding of the nature and advantages of the present invention may be realized by reference to the remaining portions of the specification and the drawings.

DESCRIPTION OF SPECIFIC EMBODIMENTS

Figure 1:
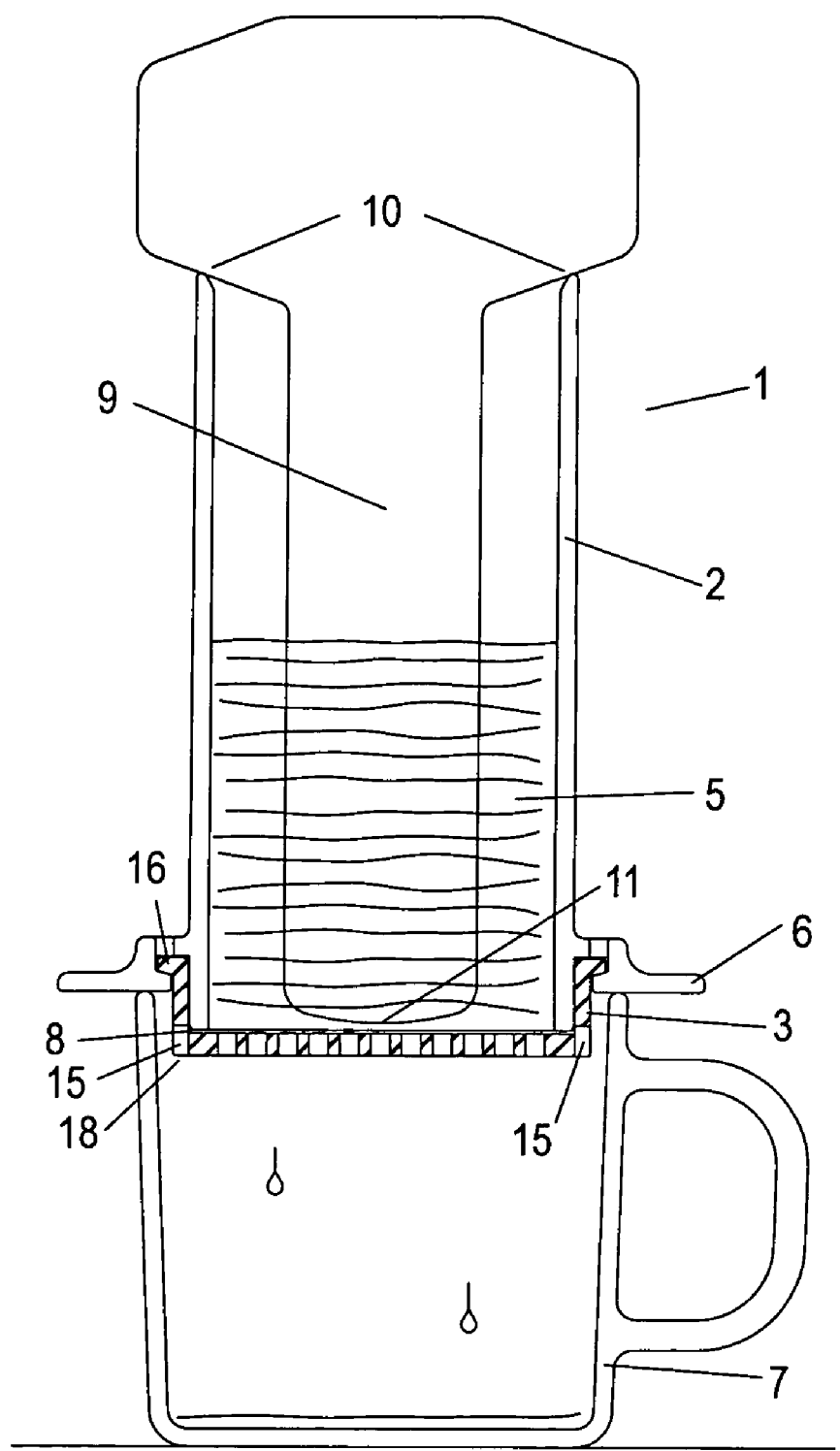
FIG. 1 illustrates a coffee or tea press according to a embodiment of the invention resting on a cup with the mixing paddle deployed during the initial mixing stage.
Figure 2:
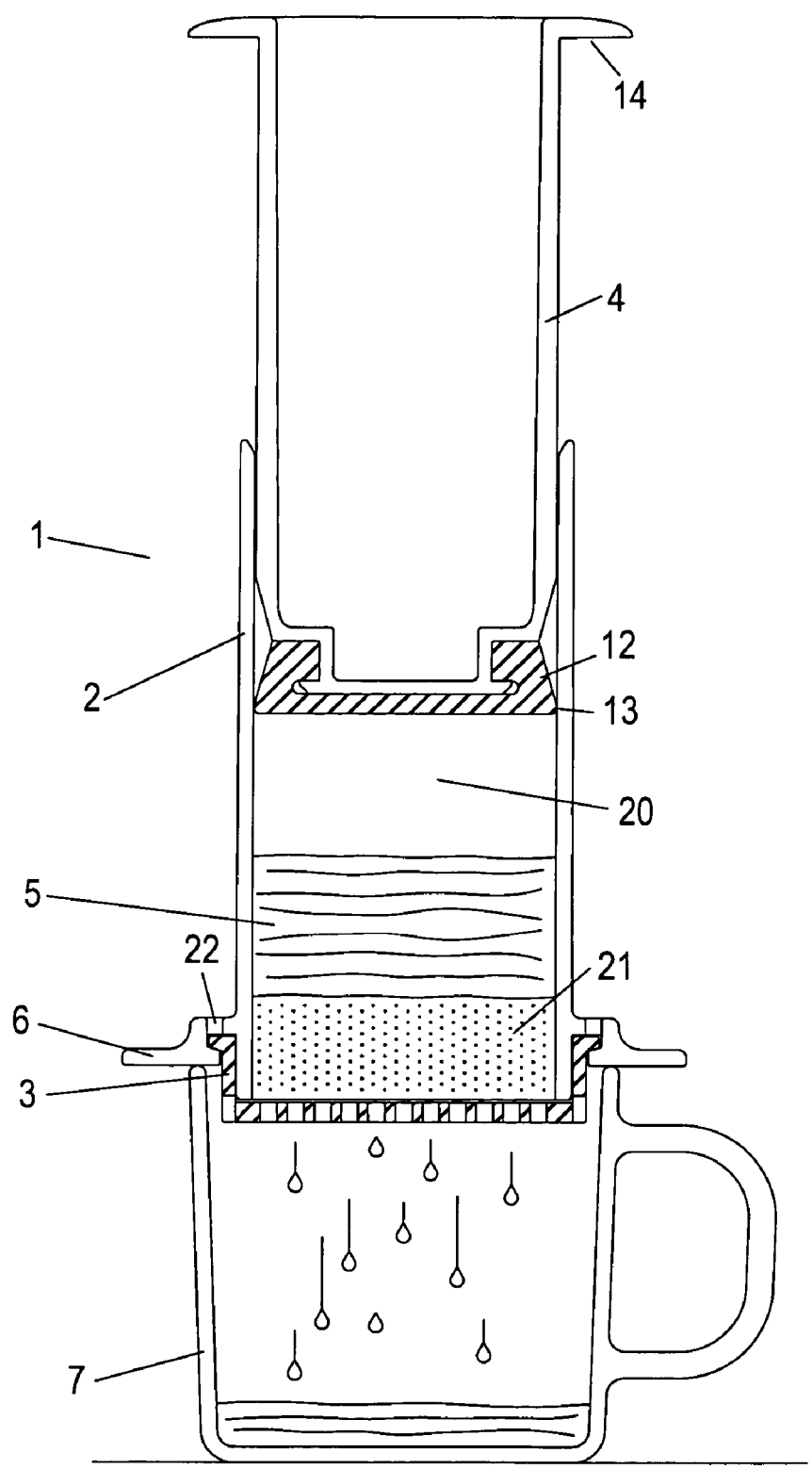
FIG. 2 illustrates the press with the piston deployed during the pressing stage.

FIGS. 1 and 2 show a coffee or tea filtering press 1 according to a specific embodiment of the invention. Press 1 includes a hollow cylinder 2 having top and bottom openings. A perforated removable cap 3 encloses the bottom opening. A removable piston 4 is inserted into the top opening and pressed downward to force liquid 5 in the cylinder through the perforated cap. The press has a support 6 to hold it on the mouth of an open vessel 7.

A filter 8 may be captured between the cap 3 and the cylinder 2 to strain particles from the liquid. As an alternative, the filter can be integrated into the cap structure.

FIG. 1 show a stirring paddle 9 having an upper stop 10 and a length, measured from its lower extremity 11 to stop 10, which is slightly less than the length of cylinder 2. The stop prevents the tip 11 of the paddle from touching the cap 3 or the filter 8 during stirring.

In operation, the press 1 is placed on an open vessel 7. Ground coffee or tea is put into the cylinder 2. Hot water is added and the mixture is stirred with paddle 9. The paddle is then removed and piston 4 is inserted into the top opening and pressed downward to force the liquid 5 through the filter and perforated cap and into the vessel. The piston pressurizes the air 20, above the liquid and it is this pressurized air which forces the liquid 5 through the cap. When the liquid is expelled, the press is then lifted off the vessel and the cap 3 is removed. Finally piston 4 is pressed farther to eject the spent puck 21 of coffee or tea into a waste receptacle.

The piston 4 is capped with a flexible seal 12 to engage the inside of the cylinder. The seal preferably has its maximum diameter 13 at its lowest point in order to wipe clean the inside of the cylinder when the maximum diameter is pushed fully through the cylinder with the cap removed during ejection of the spent puck.

The piston 4 has a stop 14 which limits the maximum travel of the piston but permits the maximum diameter 13 of the seal to extend beyond the bottom opening of the cylinder with the cap removed to eject the spent puck.

The perforated cap 3 has multiple drain holes 15, adjacent to and radially external to a perimeter line defined by the outer circumference of the bottom of cylinder 2. These drain holes relieve pressure between the outer wall of the cylinder and the inner wall of the cap and prevent leakage out of the top edge of the cap.

In FIGS. 1 and 2, perforated cap 3 is attached to cylinder 2 with a twist-lock 16.

Figure 3:
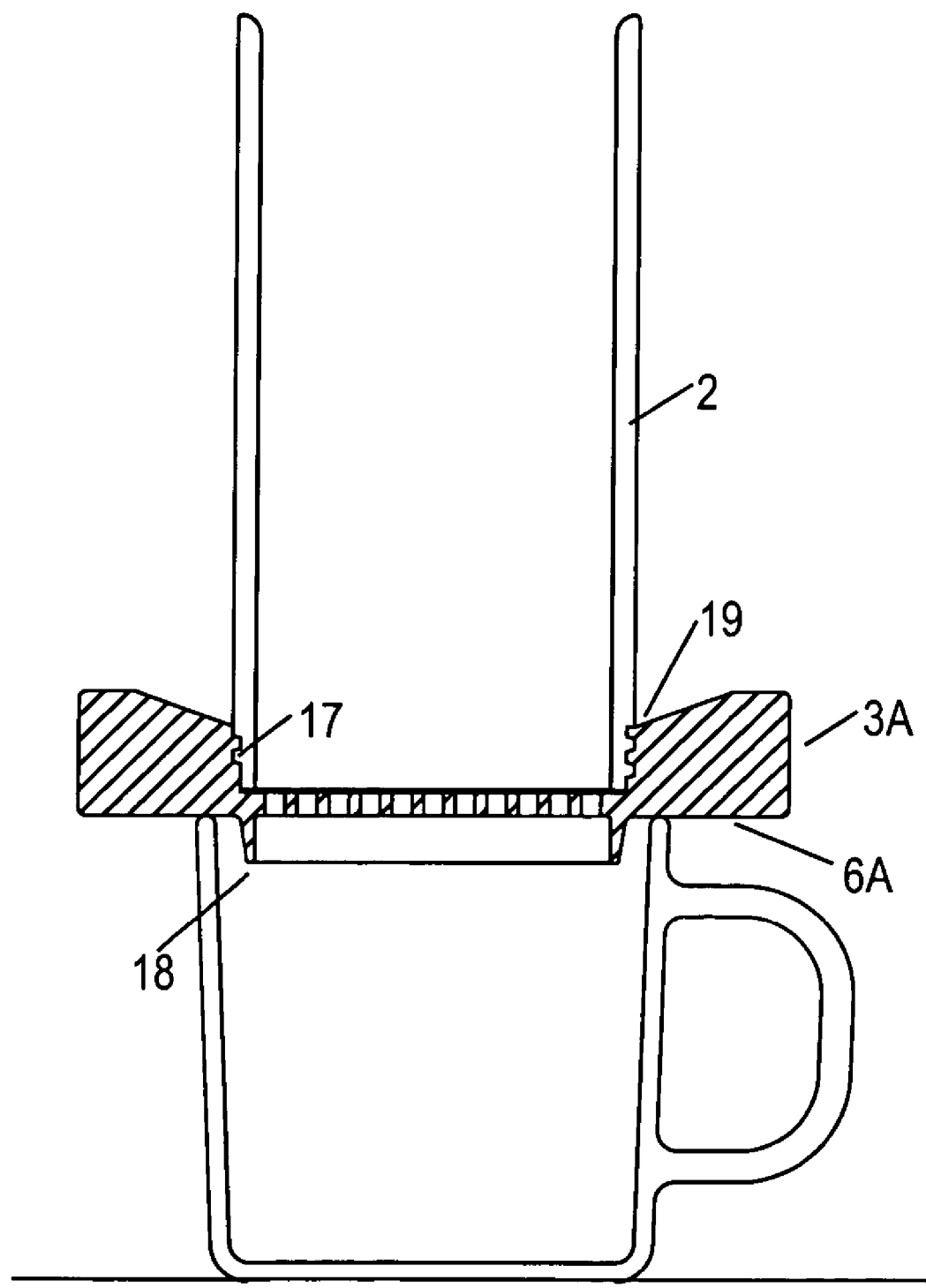
FIG. 3 illustrates an alternative version with the support extending radially outward from the perforated cap.

FIG. 3 illustrates and alternative version of the invention with the support 6A extending radially outward from the perforated cap 3A. This figure also illustrates an alternative attachment method in which the perforated cap is attached to the cylinder with a screw thread 17. Yet another alternative would be to secure the perforated cap to the cylinder with a latch.

The figures illustrate a central bottom step 18 which extends below the rim of the open vessel in order to keep the press from slipping off the vessel. In FIGS. 1 and 2, this bottom step is the lower portion of cap 3. In FIG. 3, bottom step 18 is an extension below the lower surface of cap 3A.

The alternative cap and support of FIG. 3 also has an upper cavity 19 to collect liquid which leaks between the cylinder 2 and the cap 3A.

Supports 6 and 6A are shaped to permit air to pass readily out of the open vessel when the press is resting on top of the vessel and liquid is entering the vessel. The twist lock 16 of FIG. 1 and FIG. 2 has through-holes 22 which achieve this. In the alternative of FIG. 3, the bottom surface of support 6A is roughened or grooved to achieve this same result.

While the cylinder 2 may be made from a wide range of materials, the preferred materials are transparent so that the user can observe the pressing process. Glass and transparent plastics are suitable.

While a wide range of dimension are feasible for the invention, a cylinder having an inside diameter of approximately 2.25 inches and a length of approximately 5 inches has been found to perform very well.

While the above is a complete description of specific embodiments of the invention, the above description should not be taken as limiting the scope of the invention as defined by the claims.

What is claimed is:

1. A coffee or tea filtering press comprising:
    a constant-diameter hollow cylinder having full-diameter top and bottom openings;
    a removable perforated cap that encloses said bottom opening;
    a removable air-tight piston that has an upper portion configured to be engaged by a user so that said piston, when inserted into said top opening and pressed with direct downward pressure exerted by the user, forces liquid in said hollow cylinder through said perforated cap; and
    a support to hold said press above the mouth of an open vessel.

2. The press of claim 1 wherein said support extends radially outward from said hollow cylinder.

3. The press of claim 1 wherein said support extends radially outward from said perforated cap.

4. The press of claim 3 wherein said support has an upper cavity to collect liquid which leaks between said hollow cylinder and said perforated cap.

5. The press of claim 1 wherein said support is shaped to permit air to pass readily out of said open vessel when said press is resting on top of said vessel.

6. The press of claim 1 wherein:
said piston is capped with a flexible seal to engage the inside of said hollow cylinder; and
said seal has its maximum diameter at its lowest point in order to wipe clean the inside of said cylinder when said maximum diameter is pushed fully through said hollow cylinder with the cap removed.

7. The press of claim 6 wherein said piston has a stop which limits the maximum travel of said piston but permits the maximum diameter of said seal to extend beyond the bottom opening of said hollow cylinder with the cap removed.

8. The press of claim 1 wherein said perforated cap has multiple drain holes, adjacent to and radially external to a perimeter line defined by the outer circumference of the bottom of said hollow cylinder.

9. The press of claim 1 wherein said hollow cylinder is transparent.

10. The press of claim 1 which has a central bottom step which extends below the rim of said open vessel in order to keep said press from slipping off said vessel.

11. The press of claim 1 wherein said hollow cylinder has an inside diameter of approximately 2.25 inches and a length of approximately 5 inches.

12. A coffee or tea filtering press comprising:
a constant-diameter hollow cylinder having full-diameter top and bottom openings;
a removable perforated cap that, when engaged with said cylinder, encloses said bottom opening;
a removable air-tight piston that has an upper portion configured to be engaged by a user so that said piston, when inserted into said top opening and pressed with direct downward pressure exerted by the user, forces liquid in said hollow cylinder through said perforated cap wherein said piston is capped with a flexible seal to engage the inside of said hollow cylinder; and
said piston having a sufficient range of travel that allows a maximum diameter portion of said seal to extend beyond said bottom opening and wipe clean the inside of said cylinder when said cap is removed.

13. The press of claim 12, and further comprising a support to hold said press above the mouth of an open vessel.

14. A coffee or tea filtering press comprising:
a constant-diameter hollow cylinder having full-diameter top and bottom openings;
a removable perforated cap that encloses said bottom opening wherein said perforated cap and said hollow cylinder are formed to allow said perforated cap to be attached to said hollow cylinder with a twist-lock;
a removable air-tight piston that is inserted into said top opening and pressed downward to force liquid in said hollow cylinder through said perforated cap; and
a support to hold said press above the mouth of an open vessel.

15. A coffee or tea filtering press comprising:
a constant-diameter hollow cylinder having full-diameter top and bottom openings;
a removable perforated cap that encloses said bottom opening wherein said perforated cap and said hollow cylinder are formed to allow said perforated cap to be attached to said hollow cylinder with a screw thread;
a removable air-tight piston that is inserted into said top opening and pressed downward to force liquid in said hollow cylinder through said perforated cap; and
a support to hold said press above the mouth of an open vessel.

16. A coffee or tea filtering press comprising:
a hollow cylinder having top and bottom openings;
a removable perforated cap that encloses said bottom opening;
a removable piston that is inserted into said top opening and pressed downward to force liquid in said hollow cylinder through said perforated cap; and
a stirring paddle, said paddle having an upper stop and a length, measured from its lower extremity to said stop, which is slightly less than the length of said hollow cylinder, such that said stop prevents the lower extremity of said paddle from touching said perforated cap during stirring.

17. The press of claim 16, and further comprising a support to hold said press above the mouth of an open vessel.

* * * * *